(12) United States Patent
Jang (10) Patent No.: US 11,888,343 B2
(45) Date of Patent: Jan. 30, 2024

(54) MOVING OBJECT CAPABLE OF PROTECTING A CONVERTER AND A METHOD THEREFOR

(71) Applicants: Hyundai Motor Company, Seoul (KR); Kia Corporation, Seoul (KR)

(72) Inventor: Hyun Seok Jang, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/869,486

(22) Filed: Jul. 20, 2022

(65) Prior Publication Data

US 2023/0268761 A1    Aug. 24, 2023

(30) Foreign Application Priority Data

Feb. 18, 2022    (KR) .................. 10-2022-0021352

(51) Int. Cl.
*H02J 7/34*    (2006.01)
*H02J 7/00*    (2006.01)

(52) U.S. Cl.
CPC ............ *H02J 7/342* (2020.01); *H02J 7/0029* (2013.01); *H02J 7/007182* (2020.01)

(58) Field of Classification Search
CPC ..... H02J 7/342; H02J 7/007182; H02J 7/0029
See application file for complete search history.

(56) References Cited

U.S. PATENT DOCUMENTS 10,793,020 B2 * 10/2020 Lee ..................... B60L 53/22

* cited by examiner

*Primary Examiner* — Carlos Amaya
(74) *Attorney, Agent, or Firm* — MORGAN, LEWIS & BOCKIUS LLP (57) ABSTRACT

A moving object capable of protecting a converter and a method therefor, includes a first battery outputting a voltage lower than a predetermined voltage and a second battery outputting a voltage higher than the predetermined voltage; a converter electrically connected to the first battery and the second battery and configured to convert the voltage from the first battery and to provide the converted voltage to the second battery; a protector configured to control the voltage of the first battery, which is provided to the converter, in response to a voltage difference between the first battery and the second battery reaching a protection condition; and a processor electrically connected to the protector and configured to determine, in response to the protection condition being reached, a required first battery output according to a target voltage difference between the first battery and the second battery and a request control of the moving object and to control an output of the first battery.

20 Claims, 8 Drawing Sheets

MOVING OBJECT CAPABLE OF PROTECTING A CONVERTER AND A METHOD THEREFOR

CROSS REFERENCE TO RELATED APPLICATION

The present application claims priority to Korean Patent Application No. 10-2022-0021352, filed Feb. 18, 2022, the entire contents of which is incorporated herein for all purposes by this reference.

BACKGROUND OF THE PRESENT DISCLOSURE

Field of the Present Disclosure

The present disclosure relates to a moving object capable of protecting a converter and a method for controlling the moving object, and more particularly, to a moving object capable of stably managing a voltage difference between batteries with different voltages during voltage conversion and of rapidly responding to a required power amount necessary to operate the moving object and a method for controlling the moving object.

DESCRIPTION OF RELATED ART

Large transport vehicles loaded with heavy freight and having frequent long-distance travels have used conventional fossil fuels as energy source. A large means of transportation is mainly a commercial vehicle like a bus, a large truck, and a container truck. However, in recent years, as environment-friendly energy sources are demanded to most vehicles, even large vehicles are designed to operate not by fossil fuels but by electrical energy. Like small vehicles, because large vehicles may be driven by electric batteries mounted in them but have a larger capacity and run a longer distance than small vehicles in terms of weight, load and driving distance, electric battery alone cannot satisfy performance requirements. To satisfy performance requirements, large vehicles need to have batteries with higher energy densities than those of electric batteries.

Accordingly, an alternative being considered in this regard is to use fuel cells, together with electric batteries, as the main energy source of large vehicles. The alternative is the so-called fuel cell electric vehicle (FCEV).

Figure 1:
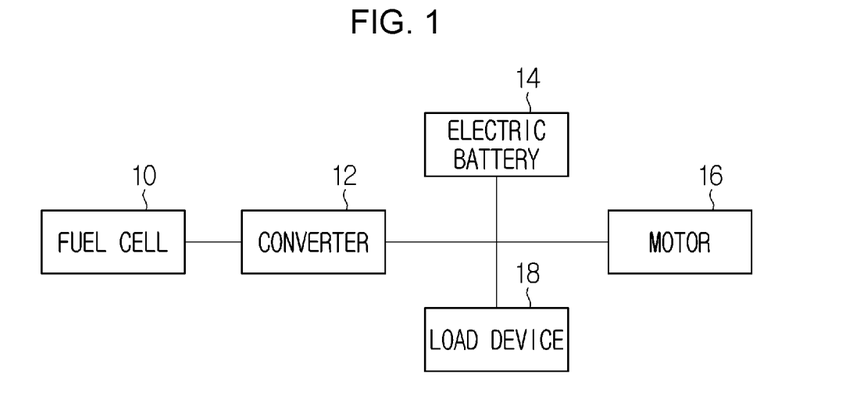
FIG. 1 a view schematically illustrating voltage conversion from a fuel cell to an electric battery in a conventional FCEV.

FIG. 1 a view schematically illustrating voltage conversion from a fuel cell to an electric battery in a conventional FCEV.

A moving object like a large vehicle is charged based on hydrogen and includes a fuel cell 10 with a high energy density and an electric battery 14 with a higher voltage output than that of the fuel cell 10. A motor 16 for driving a moving object and a load device operating at a high-voltage level may receive power from a high-voltage electric battery 14, not from a fuel cell 10 with low-voltage output. The electric battery 14 with low energy density should be charged to provide power required by a device, and charging may be implemented through the fuel cell 10. Voltage supplied from the fuel cell 10 is boosted suitably for the electric battery 14 through the converter 12, and thus the fuel cell 10 may charge the electric battery 14.

Figure 2:
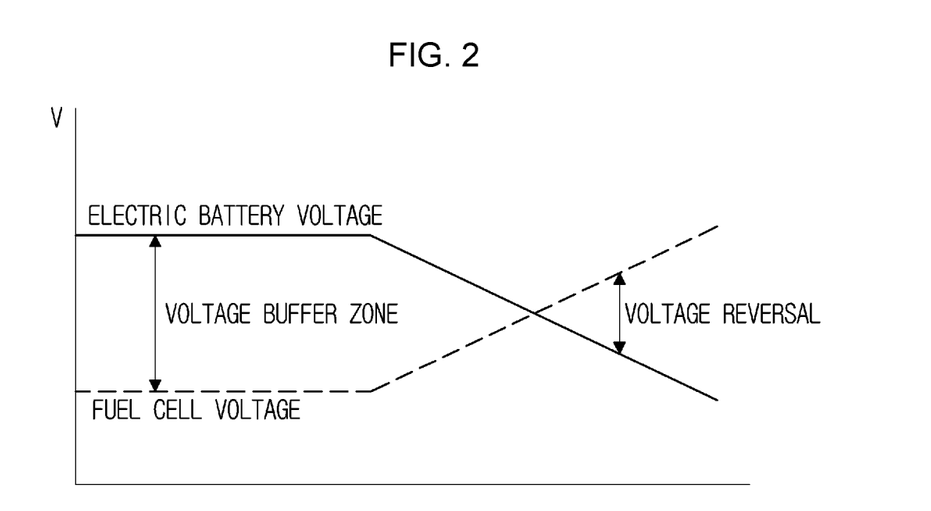
FIG. 2 is a view showing a voltage reversal phenomenon between a fuel cell and an electric battery in a conventional FCEV.

For stable boosting, as shown in FIG. 2, a voltage difference between the electric battery 14 and the fuel cell 10 should correspond to a voltage buffer zone demanded for converting. FIG. 2 is a view showing a voltage reversal phenomenon between a fuel cell and an electric battery in a conventional FCEV. However, depending on an operating situation of the moving object 100, a voltage difference may become smaller than a voltage buffer zone, or a voltage between both batteries may be reversed. In the instant case, a reverse current from the electric battery 14 to the fuel cell 10 is generated, and even when a reverse current blocking device is provided, it may be bypassed by an excessive reverse current. This may cause serious damage to a converter 106. To prevent the damage, while the fuel cell 10 is regulated for voltage drop, the converter 12 may be disabled, but this may make it impossible to stably respond to power demand of the electric battery 14 because of real-time operation of the moving object. Accordingly, various solutions are being attempted to protect the converter and to rapidly supply power simultaneously.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a moving object, which is configured for stably managing a voltage difference between batteries with different voltages during voltage conversion and of rapidly responding to a required power amount necessary to operate the moving object, and a method for controlling the moving object.

The technical objects of the present disclosure are not limited to the above-mentioned technical objects, and other technical objects that are not mentioned will be clearly understood by those skilled in the art through the following descriptions.

According to an exemplary embodiment of the present disclosure, there is provided a moving object configured for protecting a converter, the moving object including: a first battery and a second battery outputting a higher voltage than the first battery; a converter electrically connected to the first battery and the second battery and configured to convert the voltage from the first battery and to provide the converted voltage to the second battery; a protector configured to control the voltage of the first battery, which is provided to the converter, in response to a voltage difference between the first battery and the second battery reaching a protection condition; and a processor electrically connected to the protector and configured to determine, in response to the protection condition being reached, a required first battery output according to a target voltage difference between the first battery and the second battery and a request control of the moving object and to control an output of the first battery.

According to the exemplary embodiment of the present disclosure in the moving object, in response to the voltage difference reaching a release condition while the voltage of the first battery is controlled by the protector, the protector may be inactivated, and a value for the release condition may be set to be greater than the protection condition.

According to the exemplary embodiment of the present disclosure in the moving object, in response to the release condition being reached, the processor may be further configured to: determine the required first battery output based on a control request of the moving object, and control the output of the first battery.

According to the exemplary embodiment of the present disclosure in the moving object, in response to the voltage difference not reaching the protection condition, the protector may not be operated, and the processor may be further configured to determine the required first battery output based on a control request of the moving object and to control the output of the first battery.

According to the exemplary embodiment of the present disclosure in the moving object, the processor may be further configured to: determine a required moving object power amount based on the moving object control request according to a driving operation and an operation of a load device of the moving object, determine a required control power amount satisfying the moving object control request in a range following the target voltage difference, and determine a minimum value between the required moving object power amount and the required control power amount as the required first battery output.

According to the exemplary embodiment of the present disclosure in the moving object, the processor may be further configured to determine the required control power amount to cancel a disturbance by use of a disturbance observer (DOB) control operation that presents the voltage difference as the disturbance.

According to the exemplary embodiment of the present disclosure in the moving object, the moving object may further include a wheel motor configured to receive power from the converter; and a first load device and a second load device which receive power from the first battery and the converter respectively. The processor may be further configured to provide power of the second battery to the second load device and the wheel motor, in response to power of the converter being below a reference power.

According to the exemplary embodiment of the present disclosure in the moving object, the processor may be further configured to: determine an output voltage of the first battery, from which a working voltage of the first load device is subtracted, and determine an output voltage of the second battery based on a working voltage of the wheel motor and a working voltage of the second load device. The voltage difference may be a difference between the output voltage of the first battery and the output voltage of the second battery.

According to the exemplary embodiment of the present disclosure in the moving object, the processor may be further configured to determine the required first battery output by excluding an internal power which is intrinsically consumed by the first battery.

According to the exemplary embodiment of the present disclosure in the moving object, the first battery may be a hydrogen-based fuel cell including a plurality of stacks, and the processor may be further configured to: determine a required output for each of the stacks based on a required output of the first battery, and control an output thereof according to the each of the stacks.

According to another exemplary embodiment of the present disclosure, there is provided a method for protecting a converter of a moving object, the method including: converting, by the converter, a voltage from a first battery and providing the voltage to a second battery outputting a higher voltage than the first battery; controlling, by a protector, a voltage of the first battery, which is provided to the converter, in response to a voltage difference between the first battery and the second battery reaching a protection condition; and determining, in response to the protection condition being reached, a required first battery output according to a target voltage difference between the first battery and the second battery and a request control of the moving object and controlling an output of the first battery.

The features briefly summarized above for the present disclosure are only exemplary aspects of the detailed description of the present disclosure which follow, and are not intended to limit the scope of the present disclosure.

According to an exemplary embodiment of the present disclosure, it is possible to provide a moving object, which is configured for stably managing a voltage difference between batteries with different voltages during voltage conversion and of rapidly responding to a required power amount necessary to operate the moving object, and a method for controlling the moving object.

According to an exemplary embodiment of the present disclosure, even when a moving object system is in a critical situation, a voltage difference between both batteries may be maintained through a quicker response than a power control speed of a low-speed low-voltage battery, and failure of electronic portions in the moving object may be prevented beforehand.

Effects obtained in the present disclosure are not limited to the above-mentioned effects, and other effects not mentioned above may be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that those skilled in the art may easily implement the present disclosure. However, the present disclosure may be implemented in various different ways, and is not limited to the exemplary embodiments described therein.

In describing exemplary embodiments of the present disclosure, well-known functions or constructions will be omitted in detail because they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. Furthermore, when an element "includes" or "has" another element, this means that one element may further include another element without excluding another component unless stated otherwise.

In the present disclosure, the terms first, second, etc. are only used to distinguish one element from another and do not limit the order or the degree of importance between the elements unless mentioned. Accordingly, a first element in an exemplary embodiment could be termed a second element in another exemplary embodiment of the present disclosure, exemplary embodiment of the present disclosure, and similarly, a second element in an exemplary embodiment could be termed a first element in another exemplary embodiment of the present disclosure, exemplary embodiment of the present disclosure, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described In various embodiments do not necessarily mean essential elements, and some thereof may be optional elements. Therefore, an exemplary embodiment composed of a subset of elements described in an exemplary embodiment of the present disclosure is also included in the scope of the present disclosure. Furthermore, embodiments including other elements in addition to the elements described in the various embodiments are also included in the scope of the present disclosure.

The advantages and features of the present disclosure and the way of attaining them will become apparent with reference to various exemplary embodiments described below in detail Embodiments, however, may be embodied in various forms and should not be constructed as being limited to example embodiments set forth herein. Rather, these embodiments are provided so that the present disclosure will be complete and will fully convey the scope of the present disclosure to those skilled in the art.

Hereinafter, various embodiments of the present disclosure will be described with reference to the accompanying drawings.

Hereinafter, with reference to FIGS. 3A to 4, a moving object configured for protecting a converter according to an exemplary embodiment of the present disclosure will be described.

Figure 3A:
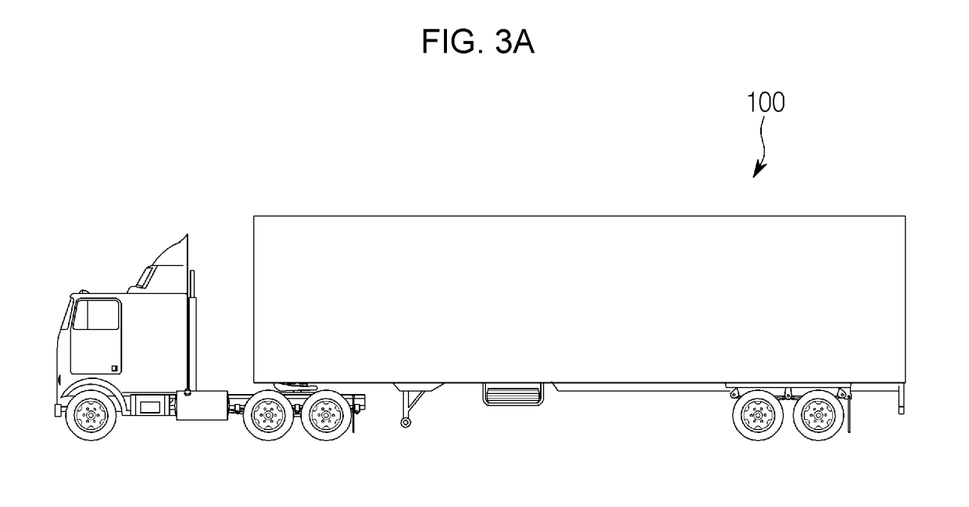
FIG. 3A and FIG. 3B are views schematically illustrating an example moving object and constituent modules of the moving object.
Figure 3B:
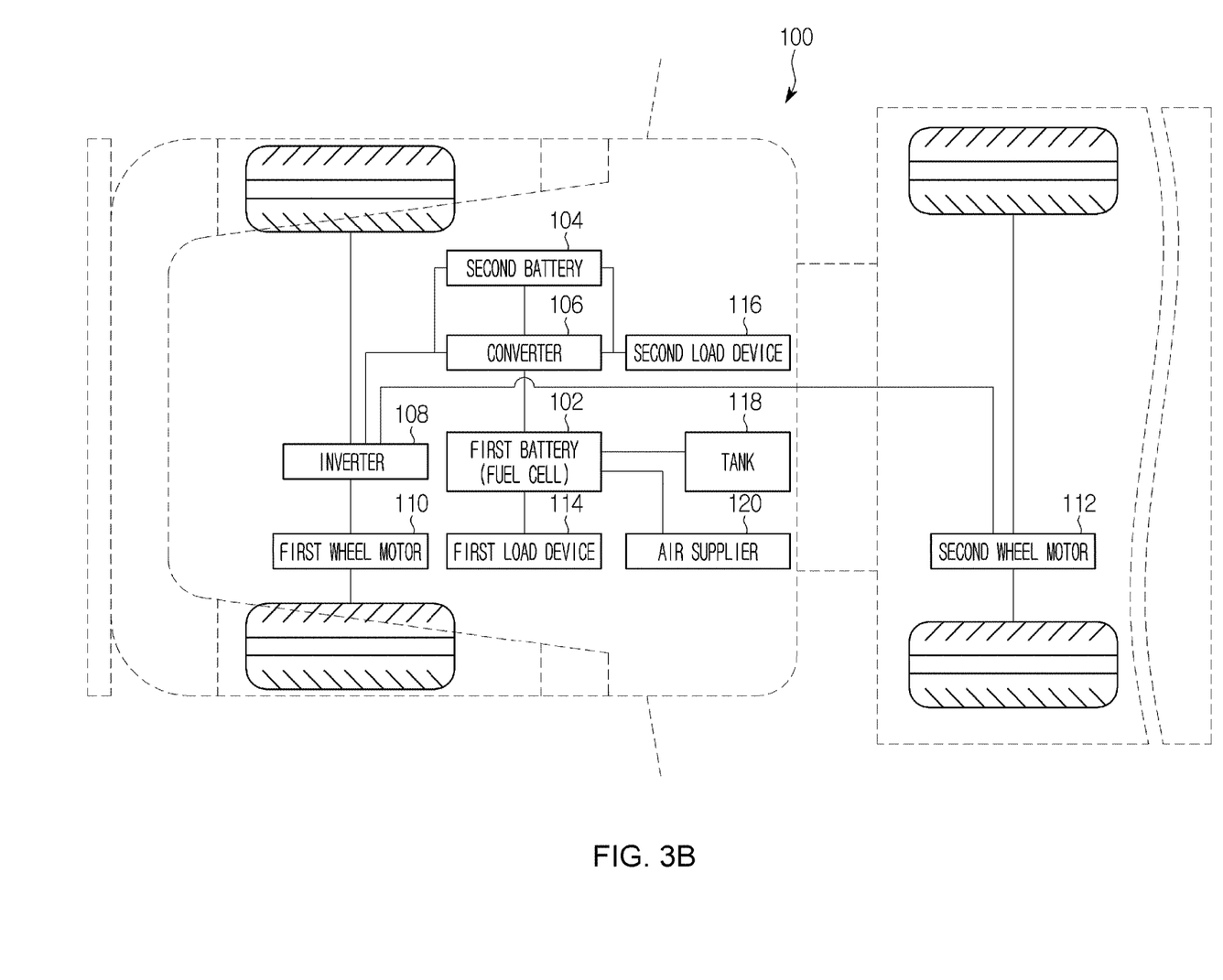

FIG. 3A and FIG. 3B are views schematically illustrating an example moving object and constituent modules of the moving object. FIG. 4 is a block diagram of a moving object configured for protecting a converter according to an exemplary embodiment of the present disclosure.

A moving object 100 may run by utilizing a first battery 102 with a low voltage output and a second battery 104 with a high voltage output and implement operations of various load devices. The first battery 102 and the second battery 104 may both constantly supply power, or the first battery 102 and the second battery 104 may be used as a main power source and an auxiliary power source respectively.

Compared with the second battery 104, the first battery 102 may have an output at a low voltage but a higher energy density or a larger charge capacity. As an exemplary embodiment of the present disclosure, the first battery 102 may be configured as a hydrogen-based fuel cell which generate electrical energy through reaction between hydrogen gas filled from an external tank 118 and oxygen flowing from an air supplier 120. The fuel cell may have a higher energy density or a larger charge capacity than the second battery 104. As exemplified in FIG. 4, the fuel cell may have a plurality of stacks 102a and generate electricity in each stack 102a. The second battery 104 may be configured as a secondary cell charged with electrical energy.

As an exemplary embodiment of the present disclosure, the first battery 102 may be configured as a secondary cell which has a higher energy density than that of the second battery 104 and thus is chargeable to a larger capacity. Embodiments of the present disclosure are applicable only when they satisfy the condition that the second battery 104 outputs a higher voltage than the first battery 102, irrespective of the types of the first battery 102 and the second battery 104, but hereinafter, for convenience of description, the first battery 102 and the second battery 104 are exemplified as a fuel cell and a secondary cell respectively.

For example, the moving object 100 may refer to a device configured for moving. The moving object may be a vehicle, a mobile office, or a mobile hotel. The vehicle may be a four-wheel car, for example, a sedan, a sports utility vehicle (SUV), and a truck and may also be a vehicle with five or more wheels illustrated in FIG. 3A, for example, a lorry, a container truck, and a heavy vehicle. In case the first battery 102 and the second battery 104, which output different voltages, are mounted on the moving object 100, the moving object 100 may be an aerial moving object, apart from a ground moving object, for example, a drone and a personal aerial vehicle (PAV). The moving object 100 may be realized by manned driving or autonomous driving (either semi-autonomous or full-autonomous driving).

Furthermore, the moving object 100 may include a converter 106, an inverter 108, first and second wheel motors 110 and 112 which are configured as driving motors, first and second load devices 114 and 116, a protector 124, a voltage monitoring unit 122, and a processor 126.

The converter 106 may convert a voltage from the first battery 102, charge the second battery 104 by providing the converted voltage, and provide power at the converted voltage to the motors 110 and 112 and the second load device 116, which are operated in a high voltage range. The converter 106 may output a voltage in a higher voltage range than the second battery 104. As an exemplary embodiment of the present disclosure, in case a power of the converter 106 is equal to or below a reference power according to an operation condition of the moving object 100, the second battery 104 may function as an energy buffer by supporting power, in addition to the power of the converter 106. so that the motors 110 and 112 and the second load device 116 may be stably driven. The power of the converter 106 may be measured after the converter 106 converts the voltage from the first battery 102 and charges the second battery 104. Furthermore, even before the second battery 104 is charged, the power of the converter 106 may be measured based on a power output from the converter 106 in which the voltage of the first battery 102 is converted. As an exemplary embodiment of the present disclosure, the converter 106 and the second battery 104 may constantly provide power to the motors 110 and 112 and the second load device 116 at the same time, configured as a constant buffer. As yet another example, in case the converter 106 and the second battery 104 are set to have different second load devices 116, electrical devices forming the second load devices 116 may be driven by different power sources.

The inverter 108 may convert a specific type of power output from the converter 106 or the second battery 104 to a different type of power and reduce voltage, and the motors 110 and 112, which generate a driving operation to the first and second wheels, may be driven by receiving power from the inverter 108.

The first load device 114 may be an electrical device configured for operating in a low voltage range output from the first battery 102, and the second load device 116 may be an electrical device configured for operating in a high voltage range, like the motors 110 and 112. For example, the first load device 114 may be a lighting system consuming small power, various types of sensors provided in the moving object 100, and at least some modules of the processor 126. For example, the second load device 116 may be an air-conditioning system related to cooling and heating and a lighting system consuming much power such as headlights and night taillights.

The protector 124 may be configured to check a voltage difference between the first and second batteries, which is received from the voltage monitoring unit 122, and when the voltage difference satisfies a protection condition, the protector 124 may be enabled, by the processor 126, to control a voltage of the first battery 102 supplied from the converter 106. Furthermore, while controlling the voltage of the first battery 102, in case the voltage difference reaches a release condition, the protector 124 may be disabled by the processor 126, to relay a voltage output from the first battery 102 to the converter 106.

Figure 4:
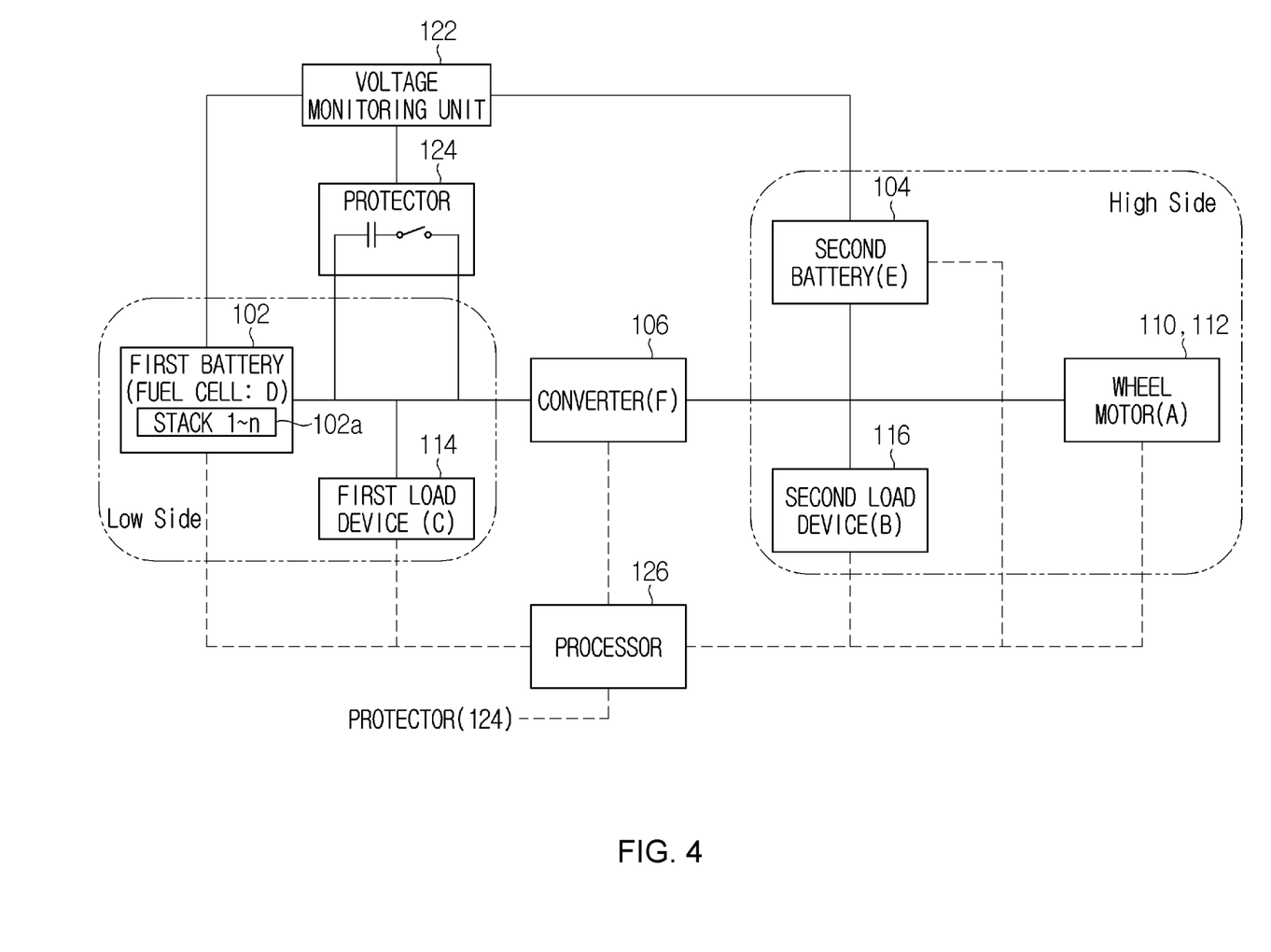
FIG. 4 is a block diagram of a moving object configured for protecting a converter according to an exemplary embodiment of the present disclosure.

As exemplified in FIG. 4, the protector 124 may include a relay switch and a capacitor configured to store a voltage of the first battery 102 and to reduce a voltage relayed to the converter 106. The relay switch may perform a relay operation as the processor 126 turns it on or off. A power path of the first battery 102 may be configured either to the converter 106 or the protector 124 by the relay of the switch.

The processor 126 may control the above-described modules of the moving object 100. In relation to an exemplary embodiment of the present disclosure, when a protection condition occurs, the processor 126 may determine a required output of the first battery according to at least one of a target voltage difference between the first and second batteries 104 and a request control of the moving object and may control the output of the first battery 102. That is, the processor 126 may perform functions associated with prevention of a burnout of the converter 106 and a power control. In relation to the power control, for example, a required first battery output may be determined by a vehicle control unit (VCU), and an output of the first battery 102 may be controlled by a first battery control unit or a fuel cell control unit (FCU). In the present disclosure, for convenience of explanation, the processor 126 is described to include both a VCU and an FCU, but a plurality of control units may be individually operated according to actual implementations. Accordingly, in the present disclosure, the processor means a conceptual controller including a single unit or a plurality of control units.

To control an output of the first battery 102, the processor 126 may control a relay operation by facilitating the protector 124. By controlling the relay operation, the processor 126 may adjust the output of the first battery 102 to the required first battery output.

A target voltage difference may be a voltage difference which is set not to generate damage of the converter 106. For example, the target voltage difference may be set to exceed a voltage buffer zone which will be described in FIG. 6 below. The target voltage difference may be set to be equal to or different from a value corresponding to a release condition. A request control of the moving object 100 may be based on a driving operation and an operation of a load device. For example, a control power for the driving operation may be the power of the motors 110 and 112, which is required for acceleration or deceleration. For example, a control power for operating a load device may be a power required to operate the first and second load devices 114 and 116.

Furthermore, when a voltage difference corresponds to a release condition or no protection condition occurs, the processor 126 may determine a required first battery output according to a request control of a moving object.

Figure 5:
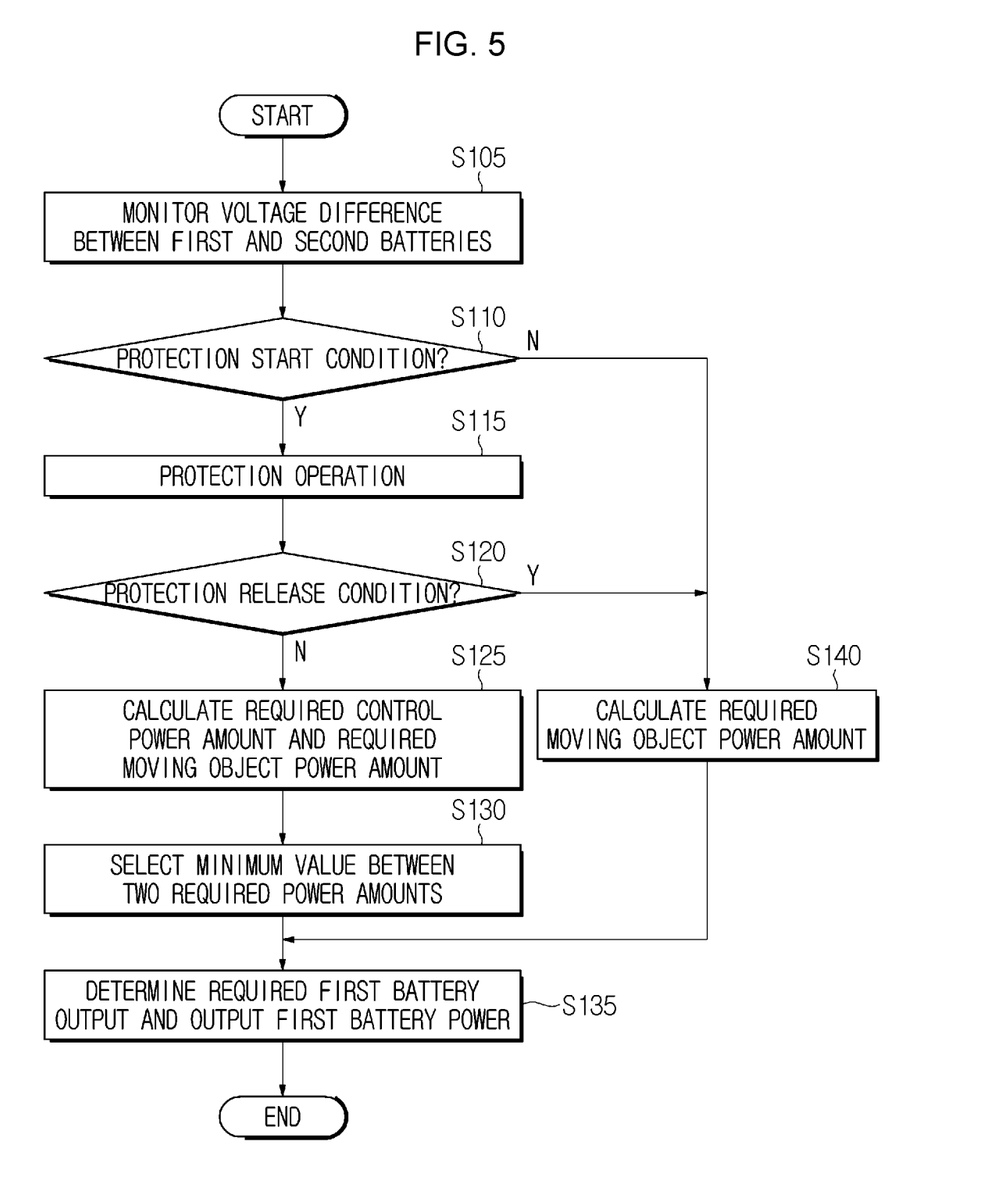
FIG. 5 is a flowchart illustrating a converter protection method of a moving object according to another exemplary embodiment of the present disclosure.

Hereinafter, with reference to FIGS. 3 to 8, a method for protecting a converter of a moving object will be described. FIG. 5 is a flowchart illustrating a converter protection method of a moving object according to another exemplary embodiment of the present disclosure.

For convenience of explanation, the present disclosure describes mainly an example in which the first battery 102 is a fuel cell with a low voltage output and the second battery 104 is a secondary cell with a high voltage output. However, in case the second battery has a higher voltage output than the first battery and is charged by the first battery, the types of the first and second batteries are meaningless, and the exemplary embodiment below may be applied.

The converter 106 may convert a voltage output from the first battery 102 to a high voltage and charge the second battery 104, and the voltage monitoring unit 122 may monitor a voltage difference between the first and second batteries 102 and 104 in real time and notify the voltage difference to the processor 126 (S105).

For example, the first battery 102 may be a fuel cell with an output of 350~600 V, and the second battery 104 may output a voltage of 420~700 V. For example, the converter 106 may boost the voltage of the first battery and output a voltage of 530~800 V. As an exemplary embodiment of the present disclosure, the converter 106 may output a voltage in a higher voltage range than the second battery 104. Furthermore, the converter 106 may charge the second battery 104 by use of the output voltage and provide power to the wheel motors 110 and 112 and the second load device 116, which are operated in a high voltage range.

As an exemplary embodiment of the present disclosure, as illustrated in FIG. 4, the voltage monitoring unit 122 may monitor a voltage difference based on voltages, which are actually output from the first and second batteries 102 and 104, without considering working voltages of the first and second load devices 114 and 116. As an exemplary embodiment of the present disclosure, the voltage monitoring unit 122 may monitor a voltage difference based on effective output voltages of the first and second batteries 102 and 104 by considering working voltages of the first and second load devices 114 and 116. In the instant case, an effective output voltage of the first battery 102 may be determined by subtracting a working voltage of the first load device 114 from an actual output voltage of the first battery 102. An effective output voltage of the second battery may be determined based on a working voltage of a driving motor and a working voltage of the second load device.

Next, the processor 126 may check whether or not the notified voltage difference corresponds to a protection condition of the converter 106 and thus may determine whether or not to start an operation of protecting the converter 106 (S110).

Figure 6:
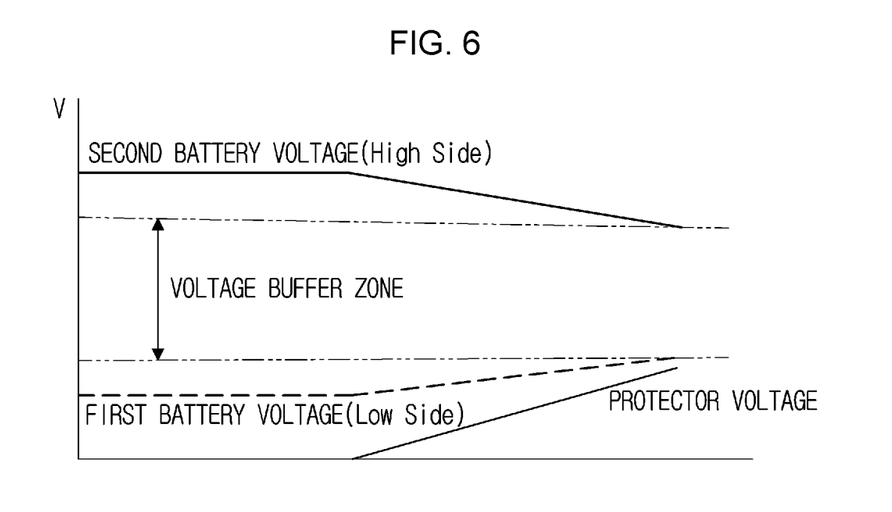
FIG. 6 is a view exemplifying a voltage difference required for first and second batteries and a protector voltage stored to maintain the voltage difference.
Figure 7:
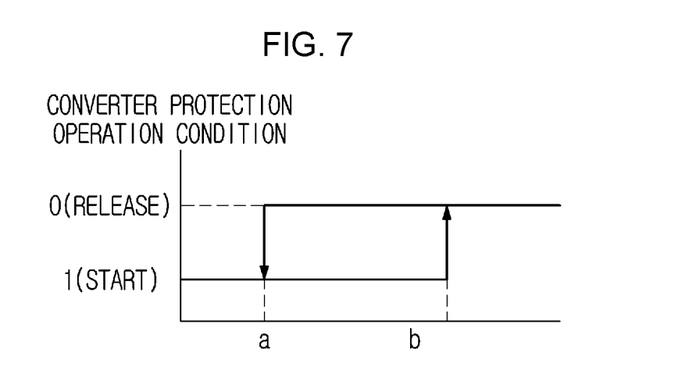
FIG. 7 is a view exemplifying ON/OFF conditions of a protector.

FIG. 6 is a view exemplifying a voltage difference required for first and second batteries and a protector voltage stored to maintain the voltage difference. FIG. 7 is a view exemplifying ON/OFF conditions of a protector.

As for a protection condition, with reference to FIG. 6 and FIG. 7, it may be associated with whether or not a voltage difference is equal to or below a value of "a", to make the voltage difference correspond to a voltage buffer zone required for converting. For stable protection of the converter 106, the value of a may be set to be above the voltage buffer zone exemplified in FIG. 6. Based on the above-described output voltages of the batteries 102 and 104 and the converter 106, the voltage difference a and the voltage buffer zone may be 50V, but this may be set according to the specifications of batteries and those of a moving object system. A voltage difference below a voltage buffer zone may be presented as a disturbance. A disturbance based on a low voltage difference causes damage on the converter 106 so that the control stability of the batteries is degraded and the system of the moving object 100 is destabilized. For example, a disturbance may be caused by a drastic drop of voltage provided to high side including the second battery 104, the wheel motors 110 and 112 and the second load device 116. When a current is limited by failure of the first battery 102, a low side voltage associated with the first battery 102 suddenly rises so that lack of energy supply to high side causes the drastic drop. Furthermore, the drastic drop may also be caused by sudden acceleration and by use of a high-energy load device, even when batteries have a low output at a low external temperature or a low state of charge (SoC).

Next, when a voltage difference corresponds to a protection condition, the processor 126 may activate the protector 124 to perform an operation of protecting the converter 106 (S115).

The protector 124 may be relay operated, by the processor 126, to adjust an output voltage of the first battery 102. As exemplified in FIG. 7, until a release condition of a voltage difference equal to or greater than "b" is satisfied, the protector 124 may store the voltage of the first battery 102, as illustrated in FIG. 6, and may reduce or adjust power output from the first battery 102 to the converter 106. Referring to FIG. 7, to prevent the converter 106 from being damaged and to enable the converter 106 to stably operate at a sufficient margin at the same time, a value of b corresponding to the release condition may be set to be greater than a value of a of the protection condition. The protection and release conditions may be set to a hysteresis range. For example, when the value of a is V, the value of b may be 80 V but may be set according to specifications of batteries and those of a moving object system.

Next, while the protector 124 is enabled to adjust the voltage of the first battery 102, the processor 126 may check whether or not a voltage difference reaches a release condition of converter protection (S120).

In case the voltage difference does not satisfy the release condition, the processor 126 may determine a required moving object power amount based on a moving object control request and a voltage difference according to a driving operation and the operation of the load devices 114 and 116 of the moving object 100 (S125). In addition, the processor 126 may determine a required control power amount which satisfies the moving object control request in a range tracking a target voltage difference.

The required moving object power amount is an amount of power required by every device operating in real time, and may be a power of the first battery 102 excluding an output that the second battery 104 may generate. As illustrated in FIG. 4, a power amount D of the first battery 102 may be determined by actually adding a voltage A due to a required torque of the wheel motors 110 and 112, a voltage B required for the second load device 116 and a voltage C required for the first load device 114 and by actually subtracting a current voltage E of the second battery 104.

Meanwhile, a required control power amount may be a power amount D of the first battery 102 which is determined when a disturbance occurs due to a low voltage difference. The required control power amount may be determined based on a target voltage difference, which a voltage difference ideally tracks, and a request control of a moving object. In the instant case, the required control power amount may be determined to cancel a disturbance by use of a disturbance observer (DOB) control operation that presents a voltage difference as a disturbance. The DOB control operation may improve the robustness of power control, which is necessary to operate the moving object 100, by measuring or estimating a disturbance component due to a low voltage difference or a reverse voltage and by reflecting the component in a control command. A required power amount for reducing a voltage difference, which instantaneously changes between the first and second batteries 102 and 104, may be determined using DOB control operation. DOB control operation for determining a required control power amount will be described with reference to FIG. 8.

Figure 8:
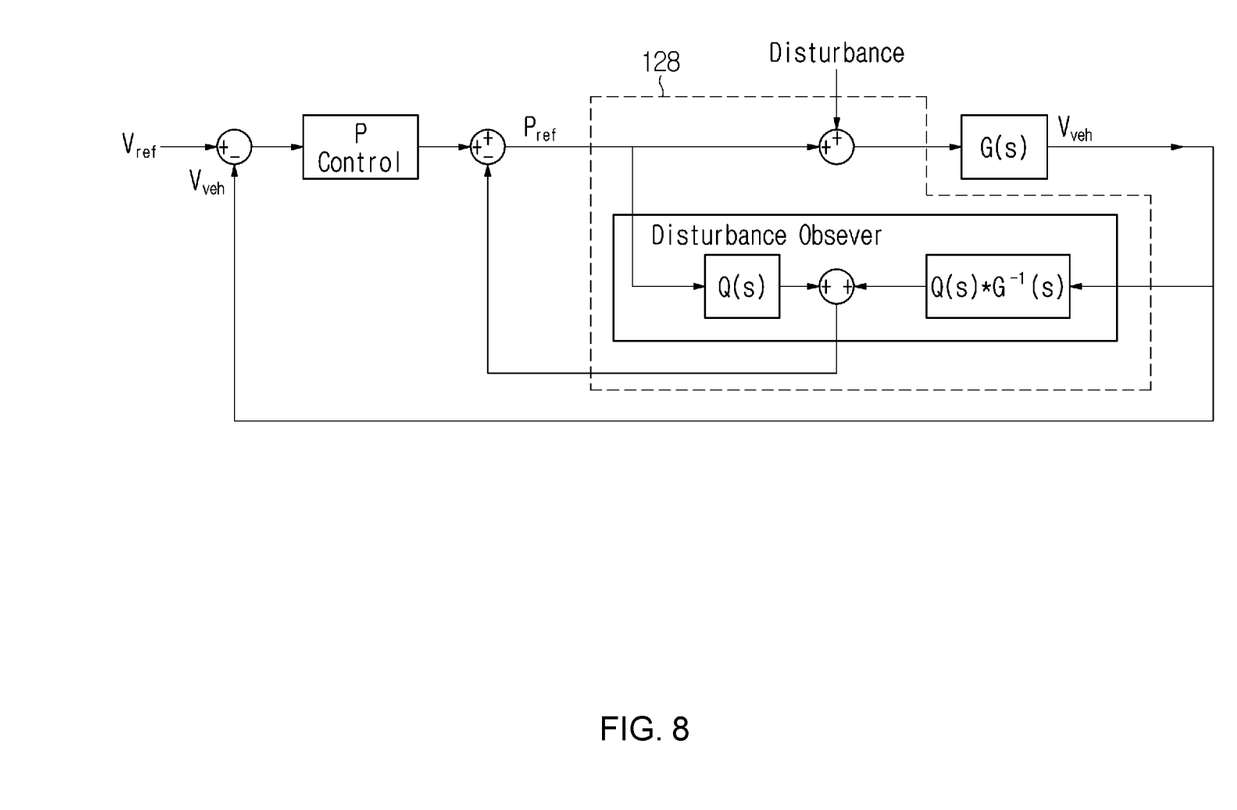
FIG. 8 is a view modeling a disturbance observer (DOB) control operation applied for determining a required control power amount.

FIG. 8 is a view modeling a disturbance observer (DOB) control operation applied for determining a required control power amount. In FIG. 8, Pref may be a required control power amount as a request power command, Vveh may be a voltage difference, and Vref may be a target voltage difference. A target voltage difference may be a voltage difference which is set not to generate damage of the converter 106. For example, the target voltage difference may be set to exceed a voltage buffer zone in FIG. 6. The target voltage difference may be set to be equal to or different from a value corresponding to a release condition.

As shown in Equation 1 below, Pref may be determined based on a DOB power and a feedback power, Equation 1 reflects a disturbance component in Pref (required control power amount) by estimating disturbance, and s denotes a frequency domain. An internal loop controller 128, which is used to determine Pref, may estimate a disturbance according to a voltage difference. A DOB power may be determined by compensating a disturbance that occurs in determining an output according to a P control value. Furthermore, the DOB power may also be determined by considering power consumption of load devices and a system loss power of the moving object 100. A feedback power, which is a P control value, may be determined based on a voltage E of the second battery 104 and a voltage D of the first battery 102.

$$P_{ref} = \underbrace{Q(s) \cdot P_{ref} - Q(s) \cdot \left[\frac{1}{k} \cdot V_{veh} - \frac{\tau}{k} \cdot \dot{V}_{veh}\right]}_{DOB\ Power} + \underbrace{K_p \cdot (V_{ref} - V_{veh})}_{Feedback\ Power} \quad \text{[Equation 1]}$$

In case a transfer function of the moving object 100 is assumed to be a first order system, Equation 2 may be applied to the modeling of FIG. 8. Accordingly, operation modeling of a required control power amount may be easily established.

$$G(s) = \frac{k}{1 + \tau s} \quad \text{[Equation 2]}$$

Furthermore, to estimate disturbance, a Q filter may include a primary low pass filter, as shown in Equation 3. In Equation 2 and Equation 3, k and i may be tuned and determined according to a disturbance type and specifications of wheel motors and load devices.

$$Q(s) = \frac{1}{1 + \tau s} \quad \text{[Equation 3]}$$

Next, the processor 126 may select a minimum value between a required moving object power amount and a required control power amount (S130).

Next, the processor 126 may determine a required power amount, which is selected as a minimum value, as a power amount of the first battery 102, that is, a required first battery output, and apply the power of the first battery 102 to the converter 106 by controlling the outputs of the protector 124 and the first battery 102 (S135).

The required first battery output may be determined by excluding an internal power which is intrinsically consumed by the first battery. This aims to effectively support a power necessary for the operation of the moving object 100, and such determination may be implemented preliminarily at step S125 or S130.

According to the present exemplary embodiment of the present disclosure, against an instantaneous voltage change which may damage the converter 106, the first battery 102 may fully charge the protector 124 so that the converter 106 may be protected. Furthermore, as a disturbance cancellation operation, for example, a DOB control operation is used, a low side power amount associated with the first battery 102 is controlled and a stable voltage difference is ensured, so that a required power amount necessary for operating a moving object may be rapidly responded.

Meanwhile, returning to step S110 of FIG. 5, in case a voltage difference between the first and second batteries 102 and 104 does not correspond to a protection condition, the protector may not operate and the processor 126 may determine a required moving object power amount based on a control request of the moving object (S140).

The required moving object power amount is actually identical with the required moving object power amount described in step S125, and the converter 106 may receive a power without adjusting a voltage of the first battery 102 and convert the voltage. Furthermore, the required moving object power Verve amount, which is determined at step S140, may be determined as a required output of the first battery, and the power of the first battery 102 may be output accordingly.

Furthermore, at step S120 of FIG. 5, while the protector 124 is enabled, if a voltage difference reaches a release condition, the processor 126 may inactivate the protector and determine a required moving object power amount based on a control request of the moving object (S140).

The required moving object power amount is actually identical with the required moving object power amount described in step S125, and the converter 106 may receive a power without adjusting a voltage of the first battery 102 and convert the voltage. Furthermore, the required moving object power Verve amount, which is determined at step S140, may be determined as a required output of the first battery, and the power of the first battery 102 may be output accordingly.

Figure 9:
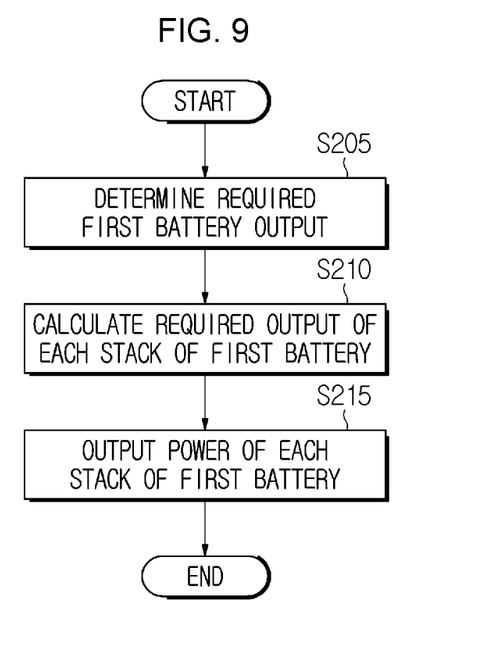
FIG. 9 is a flowchart illustrating a process of determining a required output of each stack of a first battery.

FIG. 9 is a flowchart illustrating a process of determining a required output of each stack of a first battery. An exemplary embodiment according to FIG. 9 assumes that a first battery is a hydrogen-based fuel cell including a plurality of stacks, as exemplified in FIG. 4.

First, like in FIG. 5, the processor 126 may determine a required first battery output (S205).

Next, the processor 126 may determine a required output of each stack 102a based on the required first battery output (S210). The request output of each stack 102a may be uniform or different according to actual operation.

Next, the processor 126 may provide a voltage to the converter 106 according to the required output of the stack 102a by controlling an output according to each stack (S215).

While the exemplary methods of the present disclosure described above are represented as a series of operations for clarity of description, it is not intended to limit the order in which the steps are performed, and the steps may be performed simultaneously or in different order as necessary. To implement the method according to an exemplary embodiment of the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

Furthermore, various embodiments of the present disclosure may be implemented in hardware, firmware, software, or a combination thereof. In the case of implementing the present disclosure by hardware, the present disclosure may be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium having such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A moving object configured for protecting a converter, the moving object including:
   a first battery and a second battery outputting a higher voltage than the first battery;
   the converter electrically connected to the first battery and the second battery and configured to convert the voltage from the first battery and to provide the converted voltage to the second battery;
   a protector configured to control the voltage of the first battery, which is provided to the converter, in response to a voltage difference between the first battery and the second battery reaching a protection condition; and
   a processor electrically connected to the protector and configured to determine, in response to the protection condition being reached, a required first battery output according to a target voltage difference between the first battery and the second battery and a request control of the moving object and to control an output of the first battery.

2. The moving object of claim 1, wherein, in response to the voltage difference reaching a release condition while the voltage of the first battery is controlled by the protector, the protector is inactivated by the processor, and a value for the release condition is set to be greater than the protection condition.

3. The moving object of claim 2, wherein, in response to the release condition being reached, the processor is further configured to:
   determine the required first battery output based on a control request of the moving object, and
   control the output of the first battery.

4. The moving object of claim 1, wherein, in response to the voltage difference not reaching the protection condition, the protector is not operated, and the processor is further configured to determine the required first battery output based on a control request of the moving object and to control the output of the first battery.

5. The moving object of claim 1, wherein the processor is further configured to:
   determine a required moving object power amount based on the moving object control request according to a driving operation and an operation of a load device of the moving object,
   determine a required control power amount satisfying the moving object control request in a range following the target voltage difference, and
   determine a minimum value between the required moving object power amount and the required control power amount as the required first battery output.

6. The moving object of claim 5, wherein the processor is further configured to determine the required control power amount to cancel a disturbance by use of a disturbance observer (DOB) control operation that presents the voltage difference as the disturbance.

7. The moving object of claim 5,
   wherein the load device of the moving object includes a first load device and a second load device,
   wherein the moving object further includes a wheel motor configured to receive power from the converter,
   wherein the first load device and the second load device receive power from the first battery and the converter respectively, and
   wherein the processor is further configured to provide power of the second battery to the second load device and the wheel motor, in response to power of the converter being below a reference power.

8. The moving object of claim 7,
   wherein the processor is further configured to:
   determine an output voltage of the first battery, from which a working voltage of the first load device is subtracted, and
   determine an output voltage of the second battery based on a working voltage of the wheel motor and a working voltage of the second load device, and
   wherein the voltage difference is a difference between the output voltage of the first battery and the output voltage of the second battery.

9. The moving object of claim 1, wherein the processor is further configured to determine the required first battery output by excluding an internal power which is intrinsically consumed by the first battery.

10. The moving object of claim 1,
wherein the first battery is a hydrogen-based fuel cell including a plurality of stacks, and
wherein the processor is further configured to:
determine a required output for each of the stacks based on a required output of the first battery, and
control an output thereof according to the each of the stacks.

11. A method for protecting a converter of a moving object, the method comprising:
converting, by the converter, a voltage from a first battery and providing the voltage to a second battery outputting a higher voltage than the first battery;
controlling, by a protector, the voltage of the first battery, which is provided to the converter, in response to a voltage difference between the first battery and the second battery reaching a protection condition; and
determining, in response to the protection condition being reached, a required first battery output according to a target voltage difference between the first battery and the second battery and a request control of the moving object and controlling an output of the first battery.

12. The method of claim 11, further including:
deactivating, by the processor, the protector in response to the voltage difference reaching a release condition while the voltage of the first battery is controlled by the protector,
wherein a value for the release condition is set to be greater than the protection condition.

13. The method of claim 12, further including:
in response to the release condition being reached,
determining the required first battery output based on a control request of the moving object; and
controlling the output of the first battery.

14. The method of claim 11,
wherein, in response to the voltage difference not reaching the protection condition, the protector is not operated, and
wherein the method further includes determining the required first battery output based on a control request of the moving object and controlling the output of the first battery.

15. The method of claim 11, wherein the determining of the required first battery output includes:
determining a required moving object power amount based on the moving object control request according to a driving operation and an operation of a load device of the moving object,
determining a required control power amount satisfying the moving object control request in a range following the target voltage difference, and
determining a minimum value between the required moving object power amount and the required control power amount as the required first battery output.

16. The method of claim 15, wherein the required control power amount is determined to cancel a disturbance by use of a disturbance observer (DOB) control operation that presents the voltage difference as the disturbance.

17. The method of claim 15,
wherein the load device of the moving object includes a first load device and a second load device,
wherein the moving object includes a wheel motor configured to receive power from the converter,
wherein the first load device and the second load device receive power from the first battery and the converter respectively, and
wherein the method further includes providing power of the second battery to the second load device and the wheel motor in response to power of the converter being below a reference power, before or after the converting, by the converter, the voltage from the first battery and providing the voltage to the second battery.

18. The method of claim 17, wherein the voltage difference is a difference between an output voltage of the first battery and an output voltage of the second battery,
wherein the output voltage of the first battery is determined by subtracting a working voltage of the first load device therefrom, and
wherein the output voltage of the second battery is determined based on a working voltage of the wheel motor and a working voltage of the second load device.

19. The method of claim 11, wherein the required first battery output is determined by excluding an internal power which is intrinsically consumed by the first battery.

20. The method of claim 11, wherein the first battery is a hydrogen-based fuel cell including a plurality of stacks, and
wherein the determining of the required first battery output and controlling of the output of the first battery includes determining a required output for each of the stacks based on a required output of the first battery and controlling an output thereof according to the each of the stacks.

* * * * *